Dec. 23, 1952   R. A. E. GUICHARD   2,622,346
APPARATUS FOR DISPLAYING VARIABLE INFORMATION
Filed Sept. 13, 1948   7 Sheets-Sheet 2
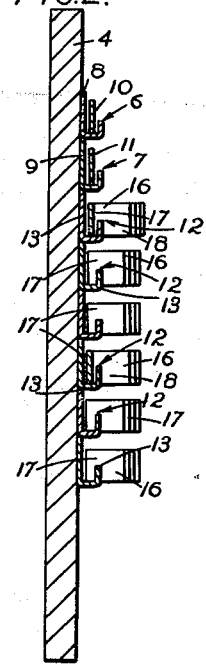
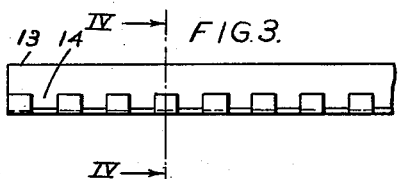
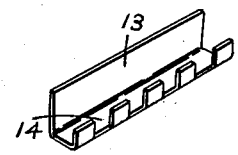
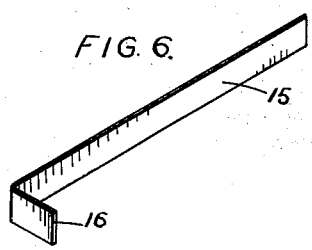
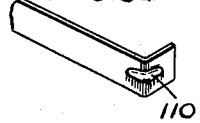
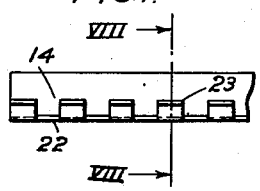
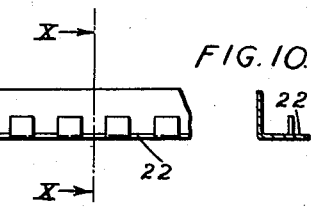
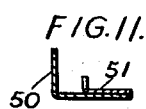
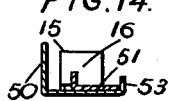
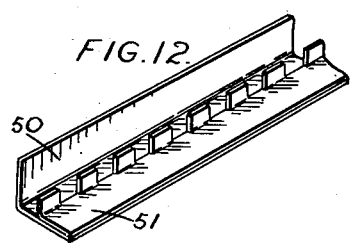
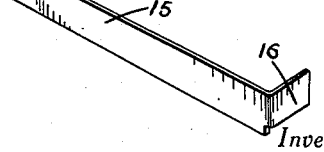
Inventor
RAYMOND ARTHUR EUGENE GUICHARD,
By
Robert B. Pearson
Attorney Dec. 23, 1952  R. A. E. GUICHARD  2,622,346
APPARATUS FOR DISPLAYING VARIABLE INFORMATION
Filed Sept. 13, 1948  7 Sheets-Sheet 3
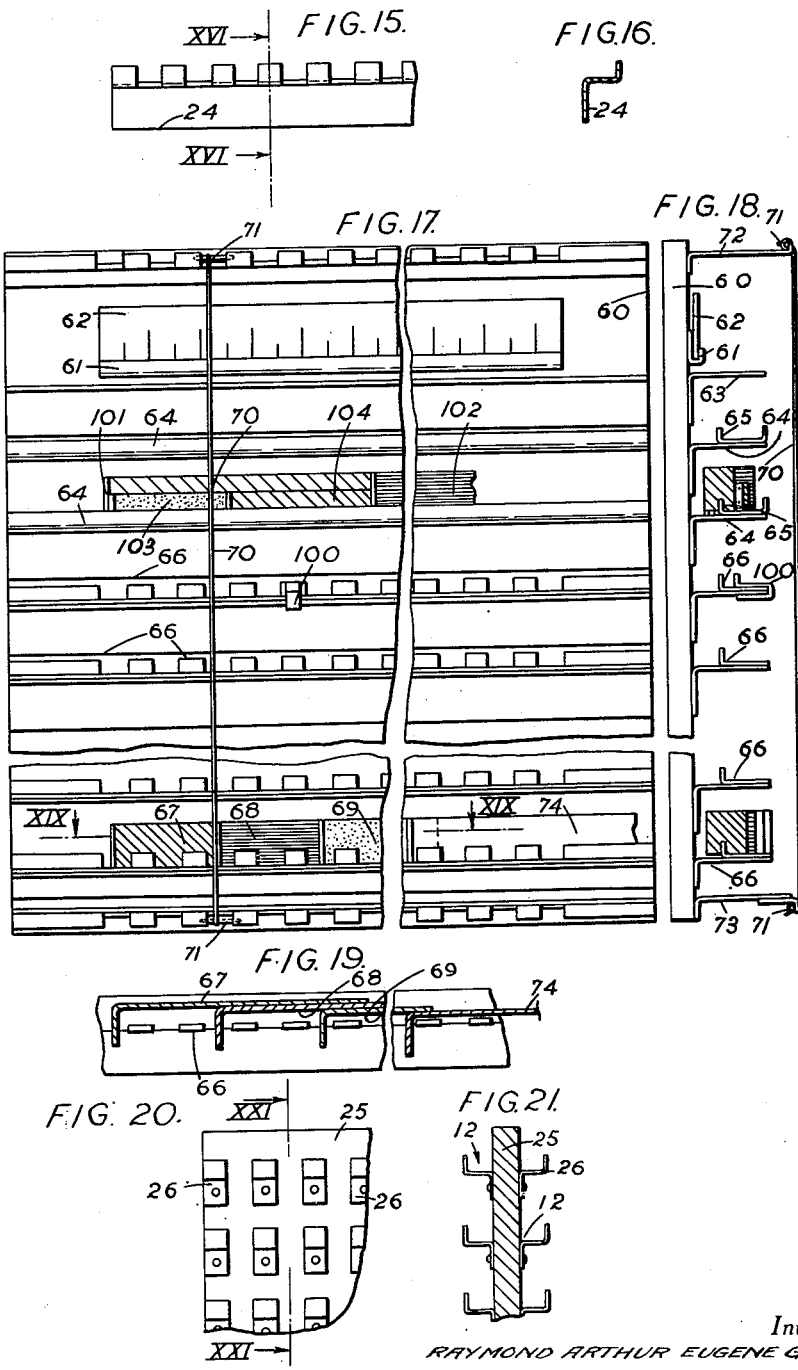
Inventor
RAYMOND ARTHUR EUGENE GUICHARD,
By
Attorney

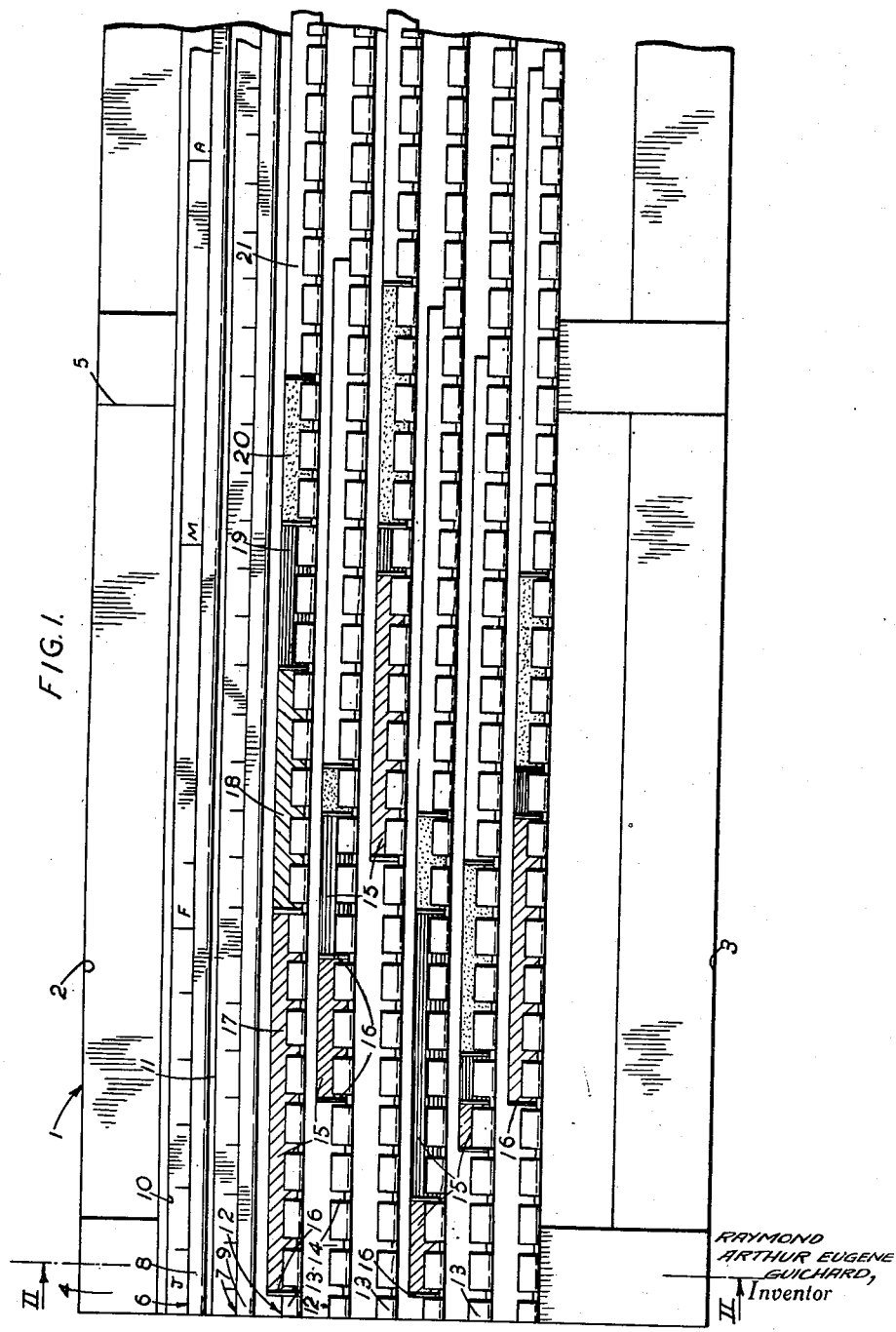

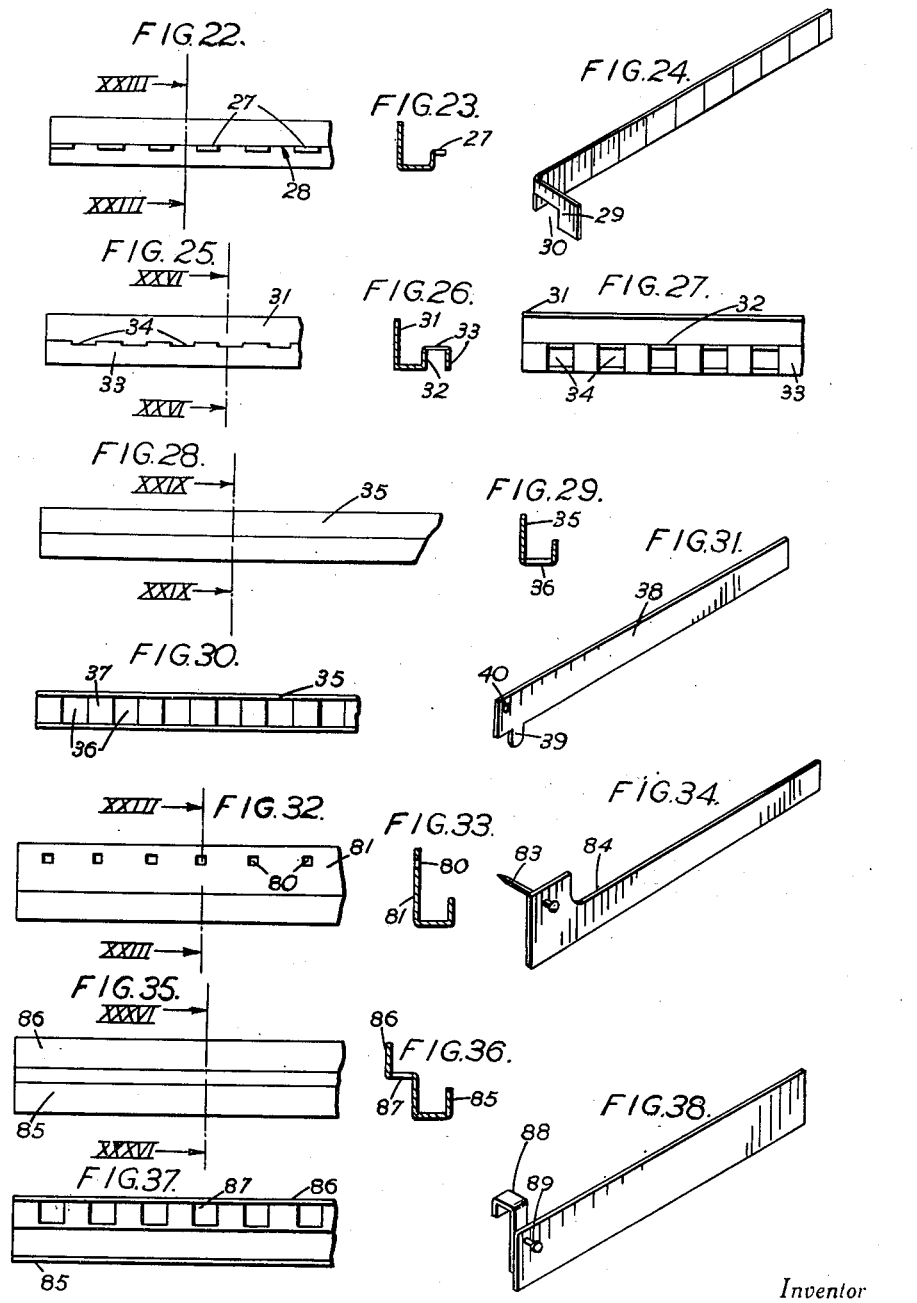

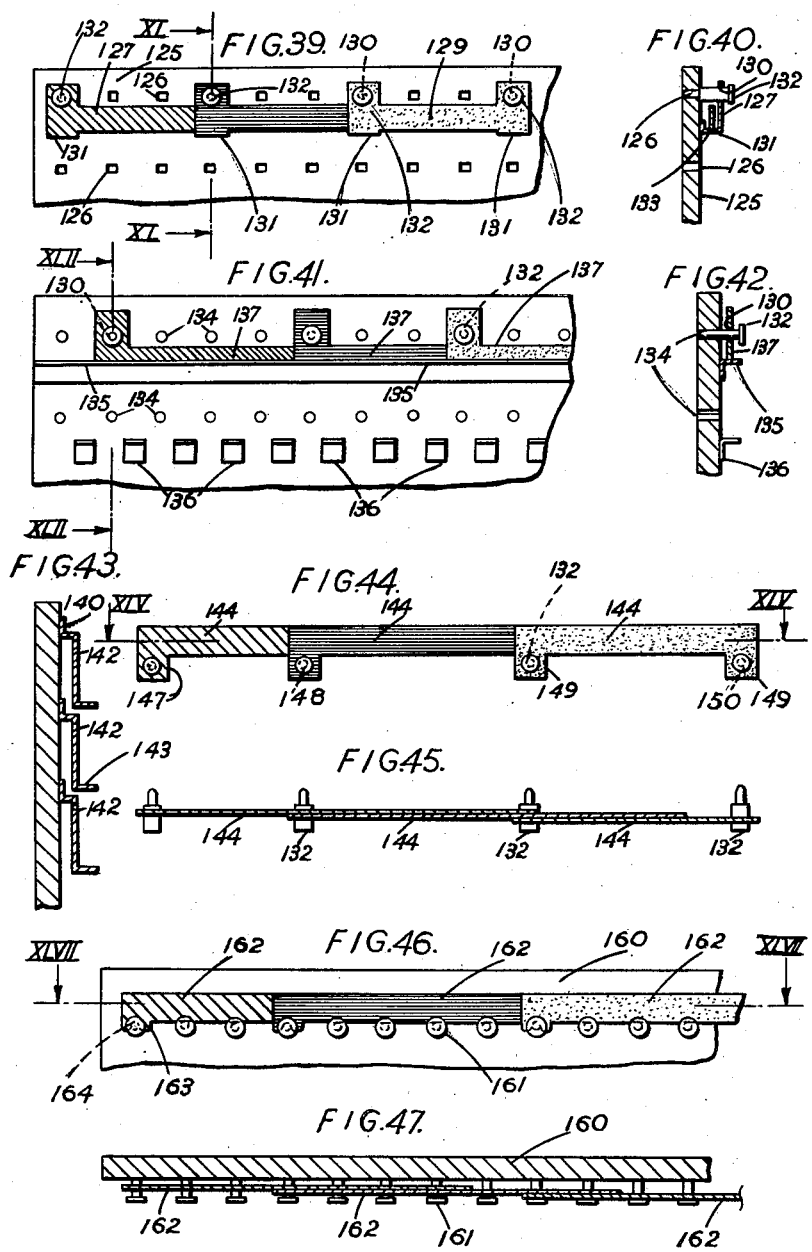

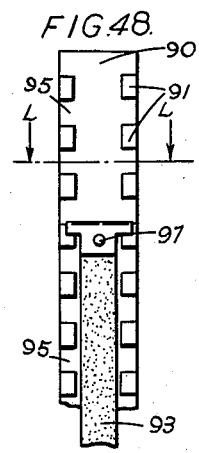
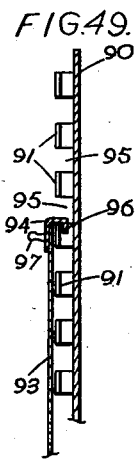
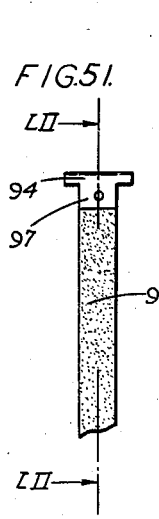
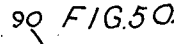
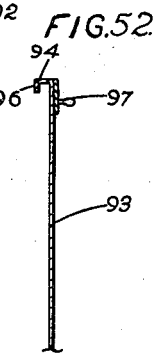
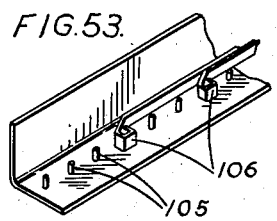
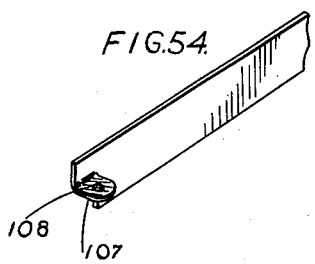
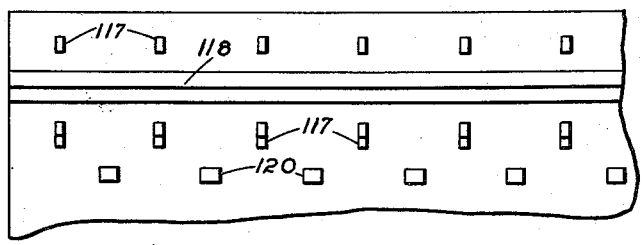
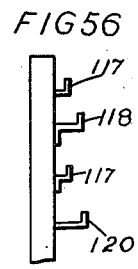

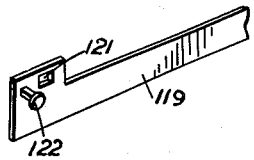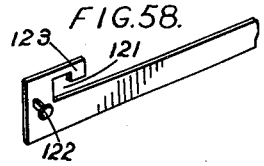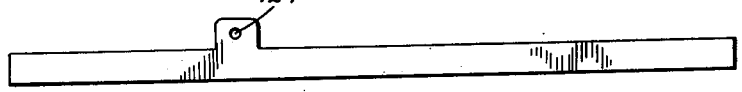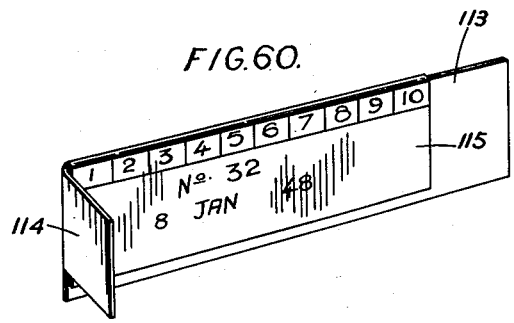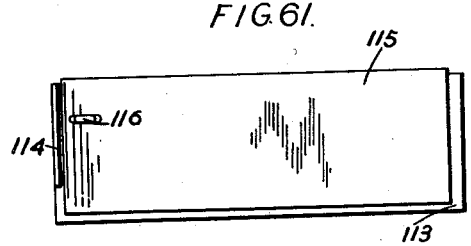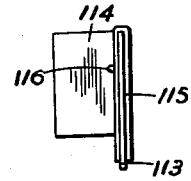

Patented Dec. 23, 1952

2,622,346

UNITED STATES PATENT OFFICE 2,622,346

APPARATUS FOR DISPLAYING VARIABLE INFORMATION

Raymond Arthur Eugène Guichard, Paris, France

Application September 13, 1948, Serial No. 48,948
In Great Britain September 29, 1947

17 Claims. (Cl. 35—24)

This invention relates to the kind of apparatus for displaying information in a clearly visible manner which is commonly known as a planning system and in which overlapping strips of plastic, cardboard or other material are moved longitudinally along a frame that is usually hung on a wall, but may be mounted on a stand. As a rule the frame includes bars or rails forming channels in which the strips can slide longitudinally. As an example of the use of such an apparatus, several strips of different colours lying one behind the other in the same channel may by their respective visible lengths indicate the quantities of a given material in stock, on order and reserved for specific purposes. To the extent to which the strips overlap, a strip in front completely conceals one or more behind it. Now as the state of affairs changes one or another strip is moved longitudinally in the channel to change the exposed and visible length of one or more of the strips and often in the apparatus hitherto used an underlying or overlapping strip is accidentally moved at the same time. In any event, the exact position of each strip in the channel is a matter of importance and with the apparatus used hitherto a strip can easily be displaced longitudinally.

It is an important object of this invention to shape the frame or the members in or by which the channels are formed on the one hand and the strips on the other hand in complementary or male and female fashion so that the strips are held against accidental longitudinal displacement.

It is another object of the invention to provide strips which carry or are shaped to form locating and holding elements which can engage in or on another of a series of complementary openings or parts spaced along the frame.

Yet another object of the invention is to provide apparatus in which the strips extend and are moved vertically.

Further objects of the invention are to provide novel frames and novel strips of advantageous construction.

In the kind of apparatus to which the invention relates overlapping strips are most conveniently made in colours contrasting not only with one another but also with the background provided by the parts in or by which the channels are formed and by the frame if this is separate from the channels. Now it is the exposed length of each strip which gives the desired information and when the last strip is put in position its whole length is exposed. It is rare for this to be of exactly the desired length and accordingly it is necessary to cut it.

The invention will be more clearly understood by reference to the accompanying drawings, which show a number of examples of channels and complementary strips and in which:

Figure 1 is a front view of one apparatus;
Figure 2 is a cross-section on the line II—II in Figure 1;
Figure 3 shows a member in which a channel is formed and is on a larger scale;
Figure 4 is a cross-section on the line IV—IV in Figure 3;
Figure 5 is a perspective view of this channel member;
Figure 6 shows one of the indicating strips employed in the apparatus;
Figure 6a shows a modified indicating strip;
Figure 7 shows a modified channel member;
Figure 8 is a cross-section on the line VIII—VIII in Figure 7;
Figure 9 shows another modified channel member;
Figure 10 is a cross-section on the line X—X in Figure 9;
Figure 11 is a cross-section showing a practical way of making the channel member illustrated by Figures 9 and 10;
Figure 12 is a perspective view of the channel member made as shown by Figure 11;
Figures 13 and 14 are sections similar to Figure 11 through two slightly modified channel members;
Figure 14a is a view similar to Figure 6 of a strip particularly suitable for use with the channel members shown in Figures 11 to 14;
Figure 15 is a front view of another channel member;
Figure 16 is a section on the line XVI—XVI in Figure 15;
Figure 17 is a front view and Figure 18 a side view of another form of apparatus;
Figure 19 is a section on the line XIX—XIX in Figure 17;
Figure 20 is a front view of part of a modified apparatus;
Figure 21 is a section on the line XXI—XXI in Figure 20;
Figure 22 shows another channel member;
Figure 23 is a cross-section on the line XXIII—XXIII in Figure 22;
Figure 24 shows a modified strip suitable for use in a channel of the kind shown in Figures 22 and 23;
Figure 25 shows a further channel member;
Figure 26 is a cross-section on the line XXVI—XXVI in Figure 25;
Figure 27 is a plan of the channel member shown in Figure 25;
Figure 28 is a front view of another channel member;
Figure 29 is a cross-section on the line XXIX—XXIX in Figure 28;
Figure 30 is a plan of the channel member shown in Figure 28;
Figure 31 shows a strip for use with the channel member shown in Figures 28 to 30;

Figure 32 is a front view of another channel member;

Figure 33 is a cross-section on the line XXXIII—XXXIII in Figure 32;

Figure 34 is a perspective view of a strip for use with the channel member shown in Figure 32;

Figure 35 is a front view of yet another channel member;

Figure 36 is a section on the line XXXVI—XXXVI in Figure 35;

Figure 37 is a plan of the channel member shown in Figure 35;

Figure 38 is a perspective view of a strip for use with the channel member shown in Figure 35;

Figure 39 is a front view of strips carrying projections which enter openings in the frame;

Figure 40 is a section on the line XL—XL in Figure 39;

Figure 41 is a view similar to Figure 39, of a somewhat modified construction;

Figure 42 is a section on the line XLII—XLII in Figure 41;

Figure 43 is a section through part of another form of frame;

Figure 44 is a front view of yet another arrangement of strips used with a frame having openings;

Figure 45 is a section on the line XLV—XLV in Figure 44;

Figure 46 is a front view of a modification of the arrangement shown in Figure 44;

Figure 47 is a section on the line XLVII—XLVII in Figure 46;

Figure 48 is a front view and Figure 49 a side view in section of part of a vertical apparatus;

Figure 50 is a section on the line L—L in Figure 48;

Figure 51 is a front view of a strip used in the apparatus shown in Figure 48;

Figure 52 is a section on the line LII—LII in Figure 51;

Figure 53 shows part of another form of apparatus;

Figure 54 shows a strip which may be used in the apparatus shown in Figure 53;

Figure 55 shows a front view and Figure 56 a side view of an apparatus in which the frame has hooks;

Figures 57 and 58 respectively show parts of two strips suitable for use with the apparatus shown in Figures 55 and 56;

Figure 59 shows another strip;

Figure 60 is a perspective view of a strip carrying a sheath bearing written matter; and Figure 61 is a front view and Figure 62 an end view of the strip shown in Figure 60.

Referring first to Figure 1, the apparatus comprises a frame 1 having horizontal top and bottom members 2 and 3 respectively, spanned by vertical members 4 and 5. As a rule the complete frame is hung on a wall. The frame carries a series of horizontal channels for the reception of indicating strips. In the frame shown there are two channels 6 and 7 at the top formed in identical members 8 and 9 each having a rear wall secured to the vertical members 4 and 5 of the frame and a front wall of lesser depth. The channel 6 receives a reference strip 10 and the channel 7 receives a reference strip 11; these strips are graduated in accordance with the use to which the apparatus is put, and as shown the strip 10 is graduated in months and the strip 11 in quantities of material. The position of such reference strips is not normally varied nor are they overlapped by any other strips, so they may simply be plain strips without special means by which they are held against accidental longitudinal displacement.

Below the reference strips there is a series of channels 12 formed in identical horizontal members 13 each having a rear wall secured to the frame and a front wall which is of lesser depth and is interrupted by vertical slots 14, as shown on a larger scale in Figures 3, 4 and 5. These channels 12 receive plastic strips 15, one of which is shown in Figure 6, having one end bent at right angles as shown at 16. These strips are of different colours and they are placed in the channels 12 to indicate the state of affairs of, say, certain stock on order, in hand but reserved for certain uses, and available for use.

Thus, in the uppermost channel 12 shown in Figure 1, red strips 17 and 18, a green strip 19 and a yellow strip 20 give such information on one particular item in stock. The lower channels 12 contain similar strips relating to other items of stock. It will be seen that the bent end 16 of each strip is inserted in one of the slots 14 and the strips extend to the right (as seen in Figure 1) from their bent ends. Each successive strip to the right overlaps and lies in front of the preceding one, so that the right-hand end of each strip is hidden. Strips of convenient practical length are provided and if a strip of any colour is too short to give the desired information, two strips of the same colour may be used. This is illustrated by the red strips 17 and 18. As the stock position changes one or more strips are moved correspondingly. Because the end 16 of each strip is lodged in a slot 14 there is no risk of accidental displacement of any other strip during the alteration of one. In effect, the bent ends 16 of each strip form male locating and holding elements which engage in one or another of complementary openings formed by the slots 14 and spaced along the frame.

It will be appreciated that a yellow strip 20 of the standard length supplied is not likely to be of exactly the right length desired to indicate the amount of stock available and in any case that amount will change from time to time. To avoid having to cut a strip to the right length, both initially and at each change, strips 21 substantially identical in colour with the frame, are provided to overlap the end coloured strips. In other words, the part which would normally be cut off is obscured by what may be regarded as a neutral coloured strip, and the eye of the user of the apparatus is attracted only by the strips of contrasting colour.

In order to stiffen the type of strip shown in Figure 6, the part of it in which the bend is made may be formed with a convexity 110, as shown in Figure 6a.

Figures 7 and 8 show a modified channel member in which the slots 14 are formed, not by completely removing parts of the front wall, but by bending those parts forwards, as shown at 22; in addition the parts left between the slots are bent forwards as shown at 23. The advantage of providing parts such as those shown at 22 is that these extend beyond the ends of the strips and so protect them from accidental damage.

Figures 9 and 10 show a construction similar to Figures 7 and 8 but without any horizontal parts 23.

It will be appreciated that Figures 9 and 10 are somewhat diagrammatic, and Figures 11 and 12 show how the channel member may readily be made by welding together an L-shaped member 50 and a smaller L-shaped member 51, the latter being slotted. If it is desired to protect the bent ends of the strips, the smaller member 51 may be replaced by a U-shaped member 52 as shown in Figure 13 or the larger member 50 may have a turned-up end 53 as shown in Figure 14.

With channels as shown in Figures 11 to 14 the strips may tend to tilt backwards. This can be prevented by making the body of the strip deeper than the tongue 16 as shown in Figures 14 and 14a. The type of channel shown in Figure 11 may also be produced by bending a single strip of metal the part 51 being bent back to lie on the horizontal part of the member 50.

Members forming channels need not be of the U-shape shown in the figures so far described. For example, as shown in Figures 15 and 16, each may be crank-shaped, having a rear wall 24 extending downwardly instead of upwardly.

In the apparatus shown in Figures 17 and 18 the frame is constituted by a panel 60. Close to the top there is a horizontal channel member 61 for a reference strip 62. Between the channel members 61 and 64 there is an L-shaped member 63 which serves to protect the strips in the upper channel member 64 from damage. Lower down there are two channel members 64 differing slightly from those shown in Figure 13 in that each is formed from an inverted-L bar and a U-shaped bar, the rear wall 65 of the U being slotted. Below these members 64 there is a series of channel members 66 differing similarly from that shown in Figures 11 and 12 in that each is formed from an inverted-L bar and a smaller L bar. Strips are shown in position in the lowermost channel member 66, namely a red strip 67, a green strip 68, a yellow strip 69 and a strip 74 of the same colour as the frame. Figure 19 shows clearly that the strip 68 can be moved between the left-hand edges of the strips 67 and 69.

Figures 17 and 18 also show an elastic cord 70 to each end of which a short piece of rod 71 is attached. At the top and bottom of the frame there are bars 72 and 73 respectively, each of which is slotted correspondingly to the channel members, the slots in the bar 72 having their mouths at the top and those in the bar 73 having their mouths at the bottom of the bar. The cord 70 is used to divide the channels into sections and there may be as many cords 70 as are required to form the desired sectors.

The channel members need not be constituted by long bars, as these may be replaced by a series of shorter elements, the spaces between which then form openings for the ends of the strips. Moreover, any of the channels may, if desired, be provided on both sides of a panel and this can then be mounted to turn as a whole about a vertical axis. These features are illustrated by Figures 20 and 21. Here the frame includes a panel 25 to which crank-shaped elements 26 are secured in horizontal rows to form discontinuous channels 12 and are mounted on both faces of the panel.

The openings may be formed between projections extending forwards from the front walls of channels, as shown in Figures 22 and 23, in which the forward projections are marked 27 and the slots 28. The complementary strips may be shaped as shown in Figure 24, each having an end 29 bent at right angles to its body and being recessed at 30 to clear the front wall of the channel.

Figures 25, 26 and 27 show a channel member having a rear wall 31, a front wall 32 and a part 33 extending first horizontally forwards from the top of the wall 32 and then downwards. Openings 34 are made in the horizontal wall of the part 33 and receive the downwardly projecting ends of strips of the kind shown in Figure 24. Of course, the openings 34 may extend downwards through the vertical wall of the part 33.

It will readily be understood that instead of using separate channel members secured to a frame L-shaped tongues may be bent out of a sheet-metal panel to form discontinuous channels.

It will be seen that in any of the openings shown in the figures so far described the bent ends of two or more strips may enter a single opening if necessary.

Instead of slotting the front walls of channels, openings may be made in their bases and receive tongues formed along or added to the lower edges of the strips. This is illustrated by Figures 28, 29, 30 and 31. Here a U-shaped channel member 35 is formed with openings 36 in its base 37, and a strip 38 with a tongue 39 which enters one or another opening is used. The strip has a hole 40 into which a pin can be pushed when the strip is to be moved.

In other constructions the strips are formed to receive, or carry, rearwardly projecting members or parts which engage slots in the rear walls of channel members. One such arrangement is shown in Figures 32 and 33 in which openings 80 are made in the rear wall 81 of a U-shaped channel member. The complementary strip is shown in Figure 34 and is formed with a hole in which a pin 83 makes a tight fit. The strip is recessed along its upper edge as shown at 84 so that the pin 83 of the next strip can move over it.

Another such arrangement is shown in Figures 35 to 38. Here the channel member is U-shaped, as shown at 85, and has an L-shaped part 86 extending rearwardly from the top of the rear wall of the U. Openings 87 are made in the horizontal wall of the part 86. The complementary strip is shown in Figure 38 and a hook 88 is fixed to the back of it, the free end of this hook engaging the openings 87. This figure also shows a fixed pin or knob 89 by which the strip can easily be handled.

Figures 39 and 40 show a construction in which openings 126 are made in a panel 125. The strips used in this construction are shown at 127. Each has an enlarged end 131 which extends upwards above the upper edge of the body of the strip and in which a hole 130 is made for the reception of a pin 132 which passes through the strip into one of the openings 126. In this construction the channels are dispensed with altogether and except for the last strip, which has two enlarged ends 131 and is held by two pins 132, each strip is made to support the next. For this purpose the left-hand end 131 of each strip is U-shaped as shown at 133 and receives the tail of the strip next to the left of it. It will be seen that the body of each strip can slide beneath the pin 132 to the right of it, so the pins do not constitute any hindrance to the operation of the device. Figures 41 and 42 show another construction in which openings are made in a panel as indicated at 134, but here strips 137 are supported by rails fixed to the panel. These rails, which are L-shaped, may be continuous as shown at 135 or discontinuous as shown at 136. Each strip has a single hole 130 for the reception of a pin 132.

Openings may be made in rails fixed to a panel but not constituting channels as shown in Figure 43. These rails 140 are formed by members of double L-shape and have openings 142 for the reception of pins 132. The lower horizontal limbs 143 of the rails constitute supports for the undersides of the strips.

Another construction, in which independent supports for the strips are dispensed with altogether, is illustrated by Figures 44 and 45. Here a panel with openings such as those shown at 126 in Figures 39 and 40 is used and each strip 144 has a downward extension 147 at one end with an opening 148 for the reception of a pin in each extension. It will be seen that the right-hand end of each strip rests on the pin by which the left-hand end of the next strip is secured to the panel and the last strip put in position has a second downward extension 149 with an opening 150 so that it is held by two pins 132. In this case the lower edges of the bodies of the strips can slide freely over the pins.

In Figures 44 and 45 the pins 132 constitute the male elements and are carried by the strips and the openings 126 constitute the female elements. Figures 46 and 47 show a construction in which this arrangement is in effect reversed. A panel 160 is provided with horizontal rows of pegs 161, and strips 162 are used, each strip having a downward extension 163 formed with a slot 164. Each strip is supported at its left-hand end by one of the pegs 161, which enters the slot 164 and its body rests on the pegs to the right of this peg 161.

The strips may be vertical instead of horizontal and have projections engaging with the frame. These projections may extend rearwardly from the strips and enter holes in the frame, but it is preferred to form wings on the upper ends of each strip to enter slots formed on both sides of a vertical channel.

One such construction is shown in Figures 48 to 52. Figures 48 to 50 show a small part of one apparatus in which a frame 90 carries a series of L-shaped elements 91 disposed in pairs of vertical rows to form a channel 92 between the two rows of each pair. A strip is shown at 93 and at its upper end is attached to a cross-bar 94, the ends of which form wings which enter the slots 95 between the elements 91. The cross-bar is L-shaped with a hook 96, as shown most clearly in Figure 52, so that the wings hook over the upper edges of the elements 91, i. e. the parts forming the lower edges of the slots 95. A knob 97 projects forward from the top of each strip for ease of handling.

Figure 53 shows a construction in which the frame carries male elements formed by vertical pin-like projections 105 spaced apart from one another. The ends of the strips used in this construction are bent into open rectangular boxes 106, the interiors of which form openings fitting over the projections 105. Another form of strip which may be used is shown in Figure 54 and has a horizontal tongue 107 with an opening 108 made in it, the projections 105 passing through these openings 108.

Figures 55 and 56 show a construction in which hooks 117 secured to a frame formed by a panel are used in conjunction with strips having openings which engage the hooks. The strips may be supported by a channel 118 or a series of channel members 120. Figure 57 shows a strip 119 with an opening 121 and a knob 122 by which it can easily be moved. Another form of strip suitable for use with hooks 117 is shown in Figure 58 and includes a hook-shaped part 123 which forms with the top of the strip an opening for a hook 117. A third form of strip for use with hooks 117, or, for example, with pins projecting forwards from a frame is shown in Figure 59. Here an upper extension in which an opening 124 is formed is displaced towards the middle of the strip.

It is to be understood that the strips can, if desired, carry printed or written matter. Since it is convenient to provide a series of strips with each frame and to use them again and again any such written matter may be put on a sheath of inverted U-section as shown at 115 in Figures 60 to 62, this sheath fitting over the top of a strip 113 having a tongue 114. To hold the sheath in position a lug 116 may be provided on the strip 113 and enter a slot made in the sheath.

In all the constructions plastic or like strips of different depths (or widths if the strips are vertical) may be provided so that a shallow (or narrow) strip can be used in front of a deeper strip. Again, the strips may be differently coloured on their two sides. An example is shown in Figures 17 and 18 in which a red strip 101 indicates for instance the amount of a given kind of stock on hand and is overlapped by a yellow strip 102 which indicates the amount of the same stock on order. A blue strip 103 of only half the depth of the strip 101 indicates the amount of the available stock required for orders already received. Since the visible length of the strip 103 may be varied as the amount required to satisfy orders varies, a red strip 104 of the same depth as the strip 103 is also provided. Further, indicating devices in the form of cursors riding in or on the walls of the channels and of various colours may also be provided, as shown at 100 in Figures 17 and 18.

I claim:

1. An apparatus for displaying variable information, comprising a frame, a plurality of strips individually movable along said frame in longitudinal overlapping relationship to give visual representations of information by their exposed parts, and inter-engaging means of the male and female type on said frame and strips, the means on the frame being spaced along the frame and cooperating with the means on the strips to hold each strip against accidental longitudinal displacement in any one of a plurality of positions, the means on the strips being individual to each strip and located out of the path of relative longitudinal movement of the lengths of said strips so that each strip can be moved without disturbing other overlapping strips.

2. Apparatus for displaying variable information comprising a frame and a plurality of strips individually movable along said frame in longitudinal overlapping relationship to give a visual representation of information by their exposed parts, said strips having locating elements and said frame being formed with a series of means complementary to said elements and cooperating with said elements to hold said strips against accidental longitudinal displacement in any one of a plurality of positions, said elements being individual to each strip and located out of the path of relative longitudinal movement of the lengths of said strips so that each strip can be moved without disturbing other overlapping strips.

3. Apparatus for displaying variable information comprising a frame and a plurality of indicating strips individually movable along said frame in longitudinal overlapping relationship to give a visual representation of information by their exposed parts, said frame having at least one channel for receiving said strips, said channel having a series of openings along a wall thereof, and each of said strips having a locating element on an end portion of the strip, said element being engageable in any selected opening to hold the strip against accidental longitudinal displacement in any one of a plurality of positions, independently of movement of said overlapping strips.

4. Apparatus according to claim 3 in which each channel has a front wall dimensioned to permit a substantial portion of said strips to project beyond the wall in a direction transverse to the length of the channel, said front wall having vertical slots therein comprising said openings, said locating element on each strip comprising an end portion thereof bent forwardly to engage in said slots.

5. Apparatus as claimed in claim 4 wherein said channels are substantially horizontal and the planes of said strips are substantially vertical and said bent end portions are urged into engagement with said slots by the weight of said strips.

6. Apparatus as claimed in claim 5 wherein the floor of said channel is extended forwardly of said front wall to support said bent end portions.

7. An apparatus according to claim 3 in which said openings are in a wall perpendicular to the planes of said strips, and said locating elements comprise tongues extending from the edge of each strip.

8. Apparatus according to claim 2, wherein said means comprise openings spaced along said frame, and said locating elements comprise a tab on one edge of each strip and means projecting from said tab to engage said openings, said projecting means lying beyond the adjacent longitudinal edge of the strip so as to lie out of the path of movement of other strips.

9. Apparatus according to claim 2, wherein said strips extend horizontally, said means comprise openings spaced along said frame, said elements comprising a tab on one edge of each strip and means projecting from said tab to engage said openings, said projecting means lying below the lower longitudinal edge of the strip so as to provide support for any overlapping strips passing thereabove.

10. Apparatus according to claim 2, wherein said means comprise openings spaced along said frame, said elements comprising a tab on one edge of each strip and means projecting from said tab to engage said openings, said projecting means lying beyond the adjacent longitudinal edge of the strip so as to lie out of the path of movement of other strips, each strip also carrying means on its lower portion for supporting overlapping strips passing above said supporting means.

11. Apparatus as set forth in claim 2, wherein said strips extend horizontally, said means comprises a row of supporting members on said frame, said locating elements comprising a downwardly extending tab at one end of each strip, said tab being slotted to embrace one of said members while the body of the strip rests on other of said members.

12. Apparatus for displaying variable information comprising a frame, a plurality of strips individually movable along said frame in longitudinal overlapping relationship to give a visual representation of information by their exposed parts, and means on said frame for guiding said overlapping strips for movement in the direction of their lengths, said means permitting slight movement of said strips in their own planes transverse to their lengths, said strips having locating elements, and said frame having a series of means complementary to said elements wherewith each of said locating elements may be engaged and disengaged upon said transverse movement thereby alternatively to permit longitudinal movement of a strip and to hold said strip against longitudinal movement in any one of a plurality of positions, said locating elements being normally positioned out of the path of longitudinal movement of the lengths of said strips.

13. Apparatus as claimed in claim 12 wherein said strips lie in a substantially vertical plane with their lengths in a substantially horizontal direction and wherein said elements are urged by the weight of the strips into engagement with said complementary means.

14. Apparatus as claimed in claim 12 wherein said strips are guided in a channel, openings are formed in a wall of said channel and each of said strips has a projection adapted to enter said openings.

15. Apparatus as claimed in claim 14 wherein said projections are perpendicular to the planes of said strips and are adapted to serve as handles by which said strips are moved.

16. Apparatus as claimed in claim 2 wherein said strips lie against said frame with one face only of said strips exposed and wherein the frontmost of said strips and at least the part of said frame adjacent said frontmost strip are of the same color, whereby said frontmost strip serves to control the apparent length of the strip next behind it but is not itself apparent, and the remainder of said strips are of contrasting colors.

17. Apparatus according to claim 2 in which said means comprise openings spaced along said frame for receiving said locating elements, said locating elements projecting from said strips toward said frame.

RAYMOND ARTHUR EUGÈNE GUICHARD.

REFERENCES CITED

The following references are of record in the file of this patent:

UNITED STATES PATENTS

| Number | Name | Date |
| --- | --- | --- |
| 732,301 | Holmes | June 30, 1903 |
| 849,251 | Lindsey | Apr. 2, 1907 |
| 1,683,827 | Ingram | Sept. 11, 1928 |
| 1,725,364 | Miller | Aug. 20, 1929 |
| 1,732,983 | Orchard | Oct. 22, 1929 |
| 1,778,737 | Szepesi | Oct. 21, 1930 |
| 1,812,159 | Lukas | June 30, 1931 |
| 1,876,236 | Jackson | Sept. 6, 1932 |
| 2,005,977 | Kitchen | June 25, 1935 |
| 2,118,675 | Jackson | May 24, 1938 |
| 2,234,249 | Hanford | Mar. 11, 1941 |
| 2,296,799 | Rosin | Sept. 22, 1942 |
| 2,502,190 | Wassell | Mar. 28, 1950 |
| 2,527,901 | Wassell | Oct. 31, 1950 |
| 2,537,974 | Devaux | Jan. 16, 1951 |

FOREIGN PATENTS

| Number | Country | Date |
| --- | --- | --- |
| 1,202 | Sweden | Mar. 22, 1907 |
| 2,670 | Great Britain | 1889 |
| 449,015 | Great Britain | June 15, 1936 |